UNITED STATES PATENT OFFICE.

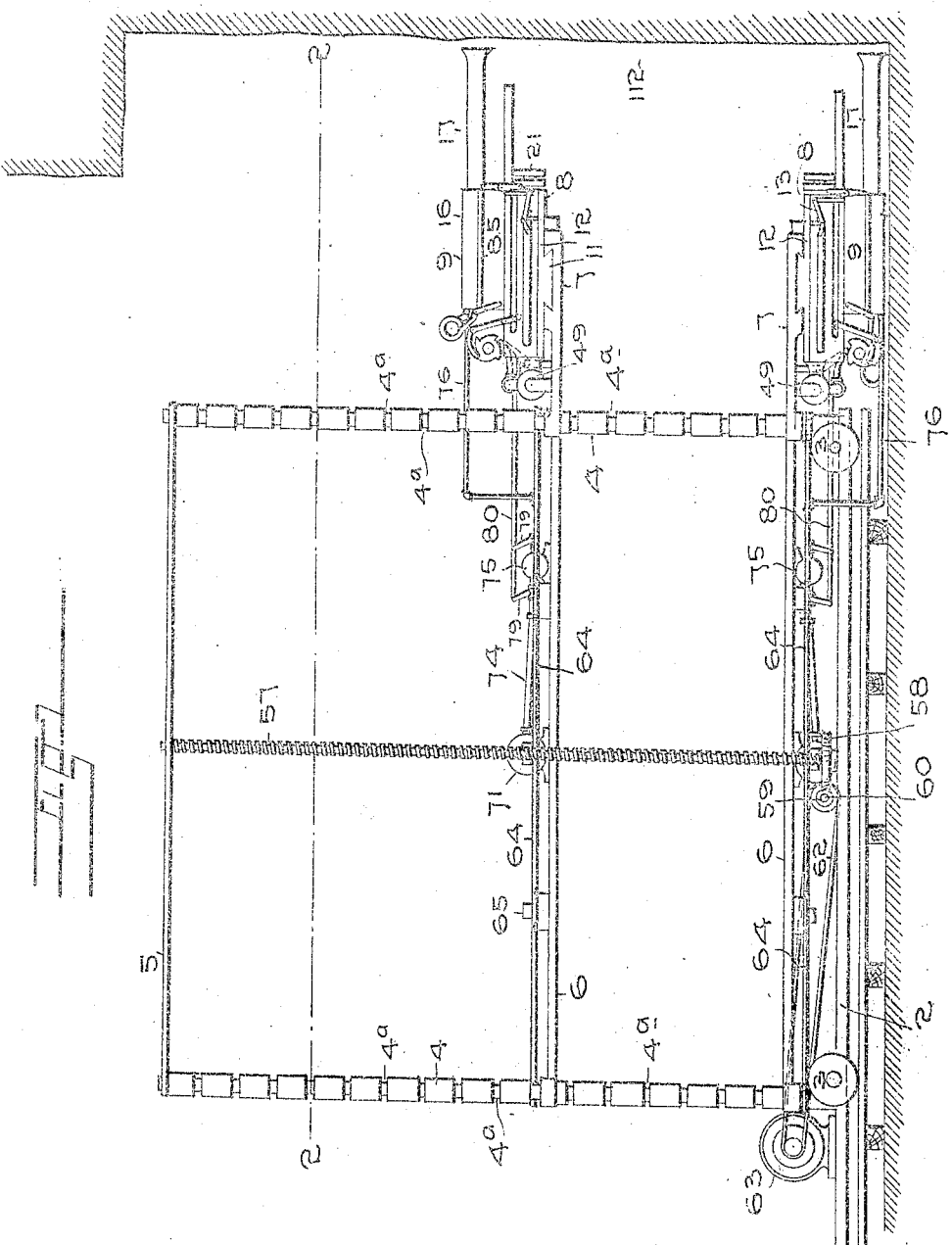

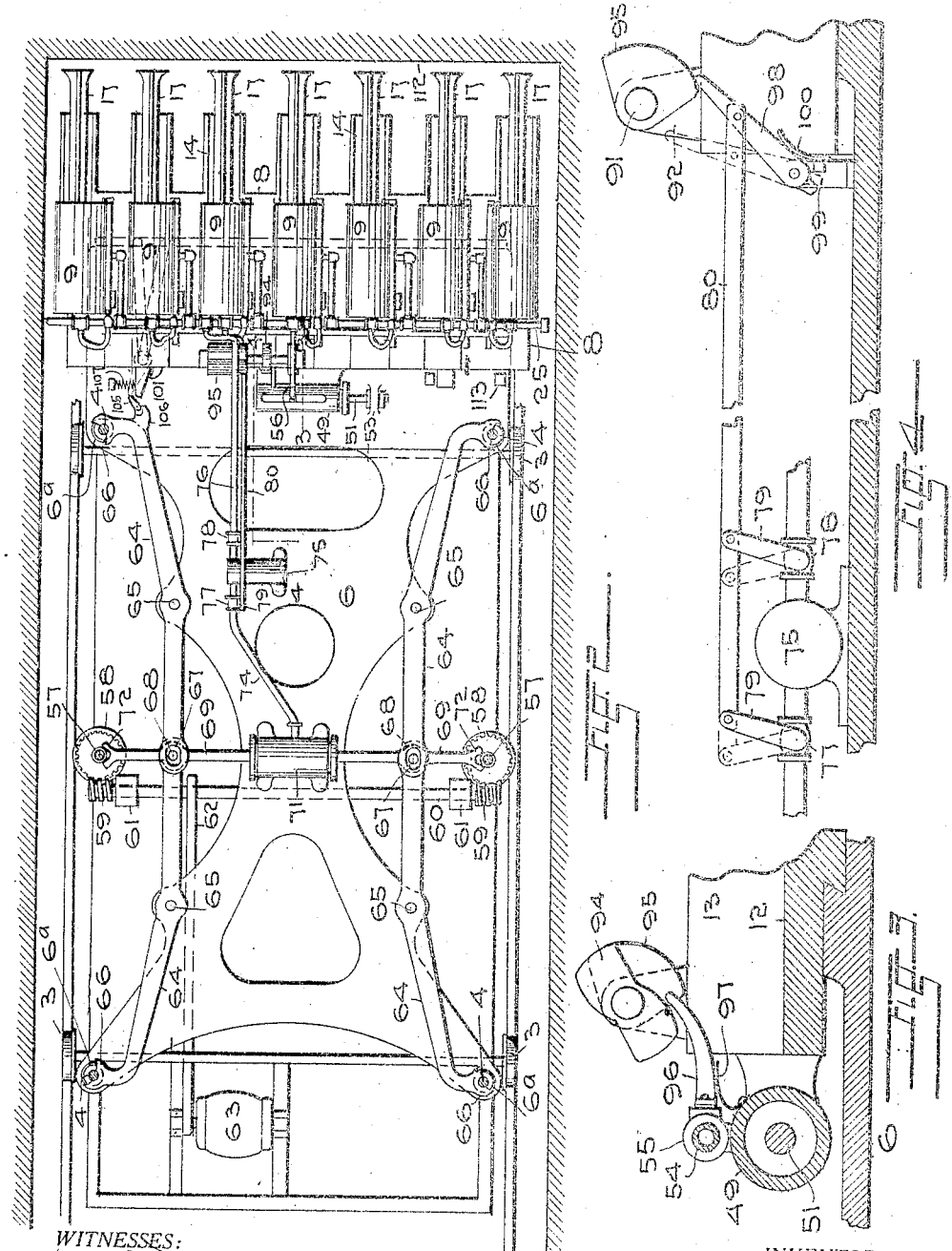

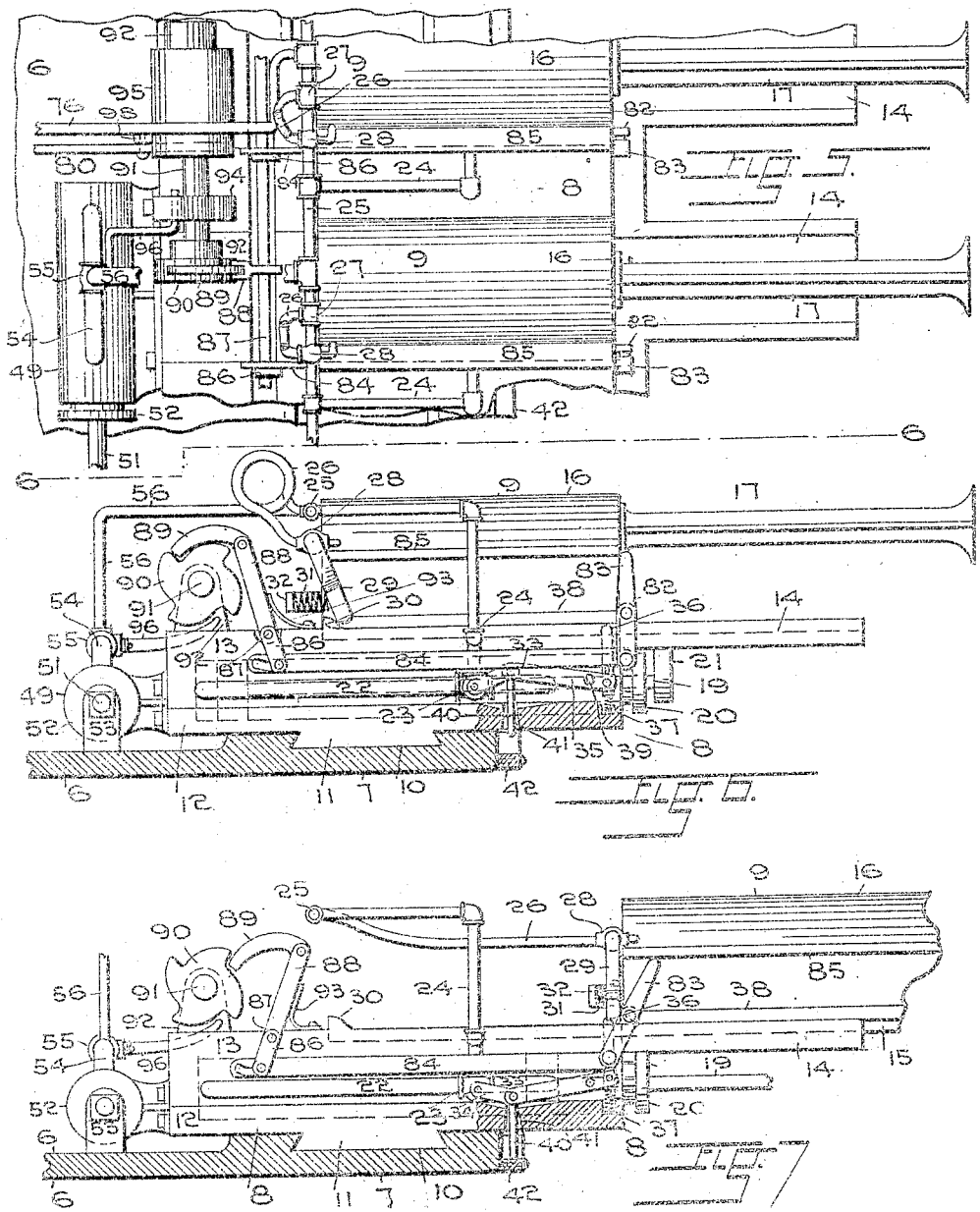

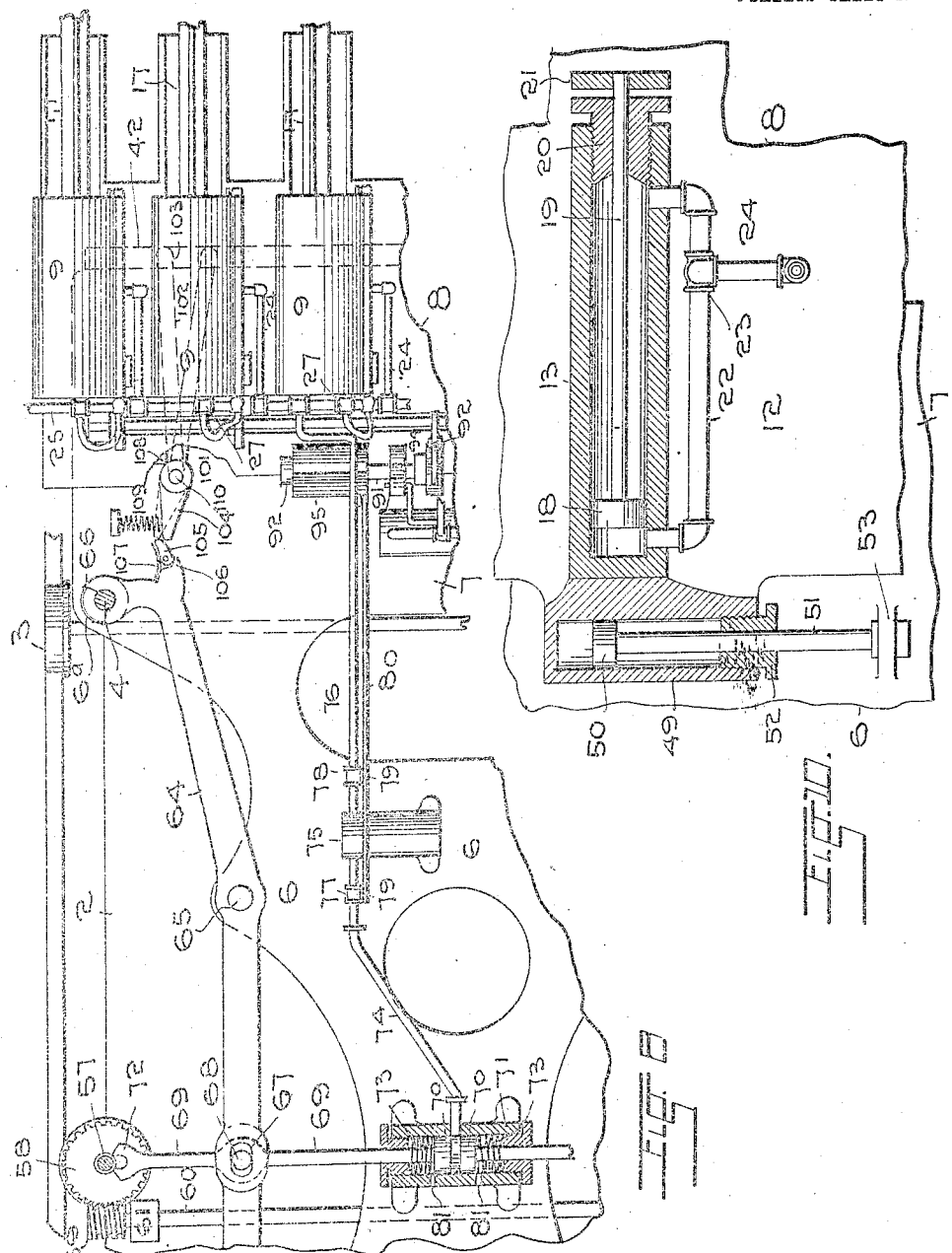

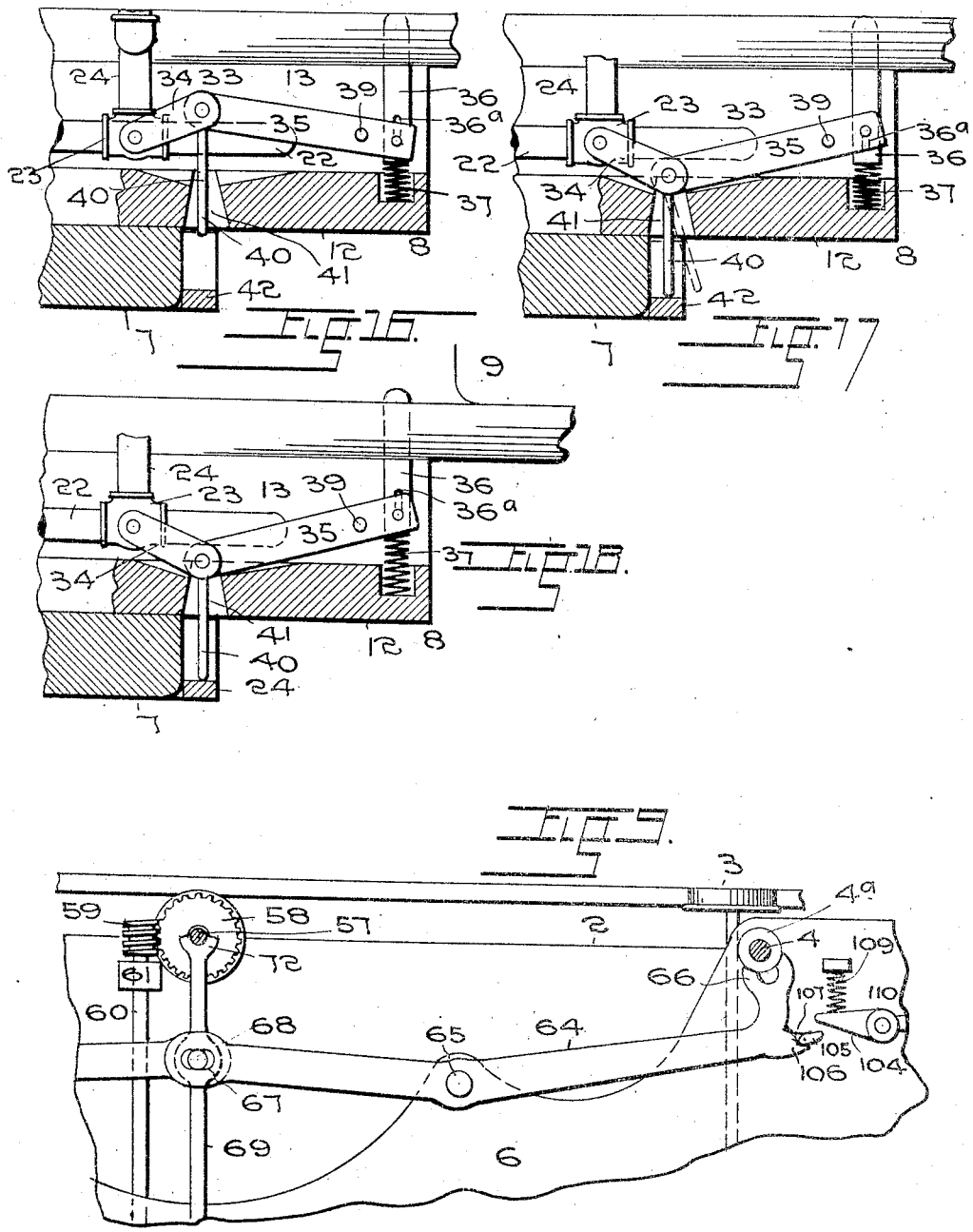

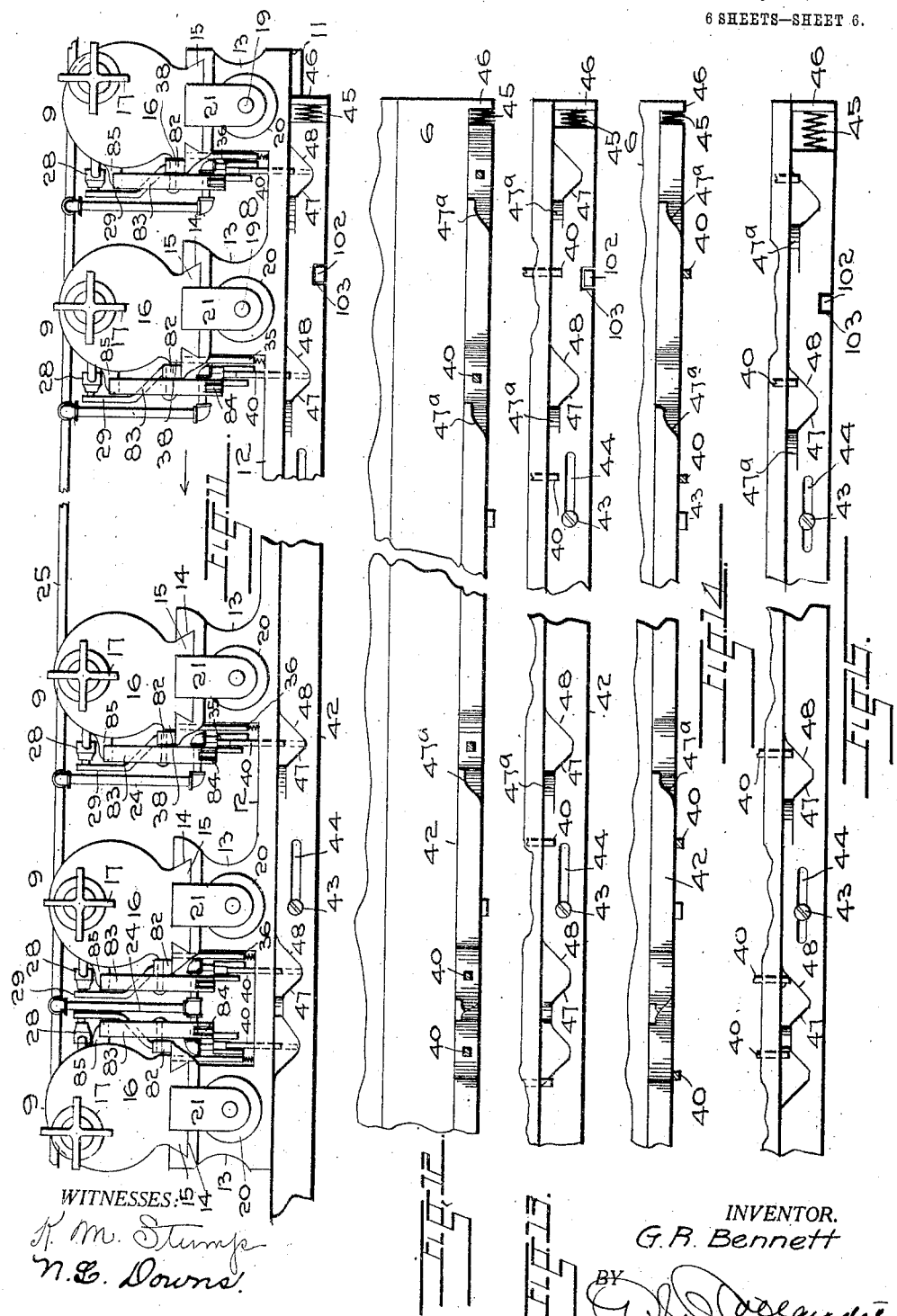

GEORGE R. BENNETT, OF DENVER, COLORADO.

TUNNELING-MACHINE.

958,932.

Specification of Letters Patent.   Patented May 24, 1910.

Application filed November 6, 1907.   Serial No. 400,985.

*To all whom it may concern:*

Be it known that I, GEORGE R. BENNETT, a citizen of the United States of America, residing at Denver, in the county of Denver and State of Colorado, have invented certain new and useful Improvements in Tunneling-Machines, of which the following is a specification.

This invention relates to improvements in tunneling machines and more especially in the class of machines designed to tunnel the rocky formations of the exterior portion of the earth for the purpose of providing a passage for railroad trains and other vehicles for the procurement of precious ores, for the construction of sewers and the like or for the conduction of water in a system of ditches or canals.

The object of my invention is to provide an apparatus of the class named by means of which the rocky substance may be penetrated irrespective of its peculiar formations, in the minimum of time and at a low cost, which being simple of construction, combines durability with thorough practicability in use and which being automatic in its operation, obviates the employment and consequent expense of expert operatives.

My invention consists, with this end in view, in providing one or more vertically successive batteries of substantially parallel, horizontally alined, independently operated power drills, which being vertically and laterally adjustable, may be effectually employed to penetrate every portion of a predetermined area.

An embodiment of the invention is illustrated in the accompanying drawings in the various views of which like parts are similarly designated and in which—

Figure 1— represents a side elevation of the machine, Fig. 2— a horizontal section taken along a line 2—2, Fig. 1, Fig. 3— an enlarged fragmentary section taken along a line 3—3, Fig. 2, Fig. 4— an enlarged fragmentary section taken along a line 4—4, Fig. 2, Fig. 5— an enlarged fragmentary plan view of the drill supporting carriage, Fig. 6— a section taken along the line 6—6, Fig. 5, Fig. 7— a similar view with the drill at the end of its forward stroke, Fig. 8— an enlarged fragmentary, sectional view taken along the line 2—2, Fig. 1, Fig. 9— a fragmentary view similar to Fig. 8, showing the reversed position of the parts included in the supporting and elevating mechanism, Fig. 10— an enlarged horizontal section through the air cylinders respectively employed to reciprocatingly move the drill bearing carriage and one of the drills supported thereon, Fig. 11— a fragmentary front view of the drill carrier, the drills mounted thereon and the subjacent platform, Fig. 12— a fragmentary plan view of the front end of the said platform and the therewith associated cam bar, Fig. 13— a front view of the said cam bar in a position identical with the one shown in Fig. 11, the extremities of the pending rods comprised in the mechanism which controls the air-inlet of the drill feed cylinder having been shown in a different position, Fig. 14— a plan view thereof, Fig. 15, a view similar to Fig. 13 with the cam bar in an adjusted position, and Figs. 16, 17 and 18— enlarged views of the mechanism employed to control the inlet of air into the drill feed cylinder, in different positions.

Referring to the drawings, the reference character 2 designates a truck, the wheels 3 of which are adapted to be presented in operative relation to the rails of a railway track and upon which are erected four vertical columns 4, arranged to form a quadrangle and connected at their upper extremities by a horizontal frame 5.

The columns 4 are designed to guide and support one or more vertically movable platforms 6, which projecting beyond the foremost end of the truck, support upon their projecting portions 7, the laterally movable drill carriages 8, upon which the horizontally alined, parallel drills 9 are longitudinally-movably mounted. Each platform 6 has, in its body portion, four openings 6ª through which the columns extend and in its projecting portion 7 a laterally ranging dovetailed guide groove 10, which is occupied by a correspondingly shaped tongue 11 on the drill carrier. The latter is composed of a plate 12 provided with a plurality of equidistant superposed, parallel, integral bases 13, whose flat upper portions are extended forwardly and provided with dovetailed guide ways 14 to receive the correspondingly shaped lowermost portions 15 of the drills 9.

The drills which individually include the housing 16 and the bit or steel 17, may be of any suitable construction, and may be designed to be actuated by means of mechanical appliances or by power derived from steam, electricity or compressed air, preference being given to the latter which is the actuating medium for which the device illustrated in the drawings is especially adapted.

To eliminate the disadvantages to a machine of the class to which my invention pertains, of the rebound caused by the impact of the rapidly reciprocating drill bits, I preferably employ in connection with my apparatus, so-called pneumatic hammer drills and more specifically those in which the rotative movement of the bits is accomplished by means of the actuating fluid.

As the specific construction of the drills does not form part of my invention a detailed representation of the same has been omitted from the drawings.

The blocks 13 which extend above the plate 12, are bored longitudinally for the reception of a piston 18, the rod 19 of which extends through a gland 20 in the foremost end of the said bore and connects with a depending lug 21 on the foremost extremity of the drill housing. A pipe 22 arranged alongside of each block communicates with the respective bore at points adjacent its extremities and is provided with a three way valve 23 by means of which the motive fluid may be introduced alternately at opposite sides of the piston for the purpose of impelling the drill toward or from the face of the rock which is being penetrated thereby. The valve 23 communicates by means of a branch pipe 24 with the main supply pipe 25 which connects with a conveniently located source of power which for obvious reasons has been omitted from the drawings.

The compressed air which actuates the drill bit is introduced into the housings 16 by means of flexible conduits 26 one end of which connects with the supply pipe at point 27, while their opposite ends are attached to a projecting portion of valves 28 applied to the housing in communication with its interior parts. The valve 28 which is designed to control the influx of air into the drill housing to which it is attached and the consequent reciprocating and rotative movements of the drill bit, is turned from its open to its closed position and vice versa by a downwardly ranging arm 29, one end of which is connected with the valve stem while its lower end terminates above the upper surface of the respective block 13 and in the path of a therewith integral projection 30. When the valve 28 is open to admit air into the cylinder during the forward movement of the drill, the arm 29 depends perpendicularly, as illustrated in Fig. 7 of the drawings, in which position it is maintained by a spring 31 arranged intermediate the lever and a laterally and rearwardly projecting lug 32 on the housing 16. The valve remains open until the drill has returned to its normal or retracted position, when by engagement with the beforenamed projection 30, the lever 29 is moved forwardly and the position of the valve is in consequence reversed. At the commencement of the forward movement of the drill, the spring 31 returns the lever to its original, perpendicular position, which movement re-opens the valve.

To obviate superfluous illustration the construction of the various valves, which may be of any suitable design, has not been shown in the drawings, and their location has merely been located in the conventional manner.

The valve 23 which controls the air inlet into the bore of each of the bases 13, is connected with the member 34 of the toggle 33, the other member 35 of which is fulcrumed at a point 39 upon the adjacent side of the said base and connects at its outer extremity with the lower, slotted end of a bar 36 which is mounted to move vertically alongside the base 13 in proximity to its foremost end. A spring 37 arranged in a recess in the plate 12, in engagement with the lowermost portion of the lever 36 tends to maintain the latter in its raised position.

When the drill is in its rearmost position as well as during its forward movement, this lever 36, whose upper portion projects through a longitudinal slot in the upper, laterally projecting portion of the base 13, is engaged by a laterally projecting longitudinal ridge 38 on the lower portion of the drill housing, which retains it in a depressed position until the drill housing and the therewith associated ridge have reached their foremost position and have passed the point of location of the lever 36, when the latter, impelled by the expansive action of the spring 37, moves upwardly and causes, in coöperation with the toggle 33, reversal of the valve 23 (as shown in Fig. 7).

The toggle 34 is provided at its joint with a depending rod or pendant 40, the upper end of which connects pivotally therewith, while its lower extremity, projecting through an aperture 41 in the plate 12 of the carrier 8, extends in front of the adjacent front edge of the extension 7 of the platform 6 and in the path of upwardly ranging cams on a cam bar 42, which movably engages the said front edge, subjacent the plate 12.

The bar 42 is held against vertical displacement by means of bolts 43 which being secured in the platform 6, project through longitudinal slots 44 in the said bar, while a contracting spring 45, arranged intermediate an end of the bar and a projection 46 on the platform, resiliently retains the former in its normal position as illustrated in Figs. 11 to 14 inclusive. The bar 42 is formed in its upper surface with angular depressions, the oppositely inclined faces 47 and 48 of which constitute the cams designed to engage the pendant 40 during certain periods in the operation of the device. The inclined face 47 terminates at its upper extremity in a laterally inclined edge 47ª which extends below the upper surface of the bar from its face rearwardly to a point in adjacency to its rearmost side, and whose function is to direct the extremity of the rod 40 after it has traveled upwardly along the face of the cam 47, outwardly, off the said incline, to engage the outer face of the bar as is illustrated in Figs. 13 and 14 of the drawings. The opening 41 in the plate 12 through which the rod 40 extends, has to this end been made flaring, so as to permit movement of the said rod about its pivotal axis in the direction toward the front of the machine.

The movement of the drill carriage 8 laterally in relation to the platform 6, is accomplished by means of a hollow cylinder 49 which forming part of the said carriage, extends parallel thereto beyond its rearmost edge, and in which is fitted a piston 50, the rod 51 of which extends through a gland 52 in the open extremity of the cylinder and is held in fixed relation to the platform 6 by means of a therewith integral, upwardly extending bearing 53. A pipe 54, extending longitudinally above the cylinder 49, communicates with the latter's bore at its opposite extremities and is provided with a three way valve 55 by means of which the motive fluid may be introduced alternately at opposite sides of the piston and which connects by means of a conduit 56 with the main supply pipe 25. Each platform 6, moves, during the operation of the apparatus, intermittently in a vertical direction for the purpose of bringing the drills in the battery supported thereon, in engagement with the different portions of the area it is desired to tunnel, the length of the said vertical movements being uniform and predetermined. I provide to this end, two lead screws 57, which extending vertically, at opposite sides of the truck intermediate and alined with the columns 4, are rotatably mounted in suitable bearings upon the said truck and the top frame 5. The screws 57 are provided at their lower ends with worm wheels 58 into which mesh worms 59 secured at opposite ends of a shaft 60 which is rotatably mounted, transversely of the truck in bearings 61.

A rotary movement is imparted to the shaft 60 during the operation of the machine, by means of a belt or chain 62 which connects with a motor 63 mounted upon the rear end of the truck and which may be actuated through the medium of electricity, air or other motive fluid. The columns 4 are formed with equidistant peripheral grooves 4ª adapted to receive the semi-circular extremities 66 of levers 64 which are reversedly arranged in pairs at opposite sides of each platform 6 upon which they are fulcrumed by means of bolts or pins 65.

The extremities of the levers 64 remote from the ends engaging the columns, in each pair, overlap and are provided with registering slots 67, through which extends a pin 68, projecting laterally from a rod 69 which extending between the slotted ends of the levers, forms part of a piston 70 which, together with the piston connected with the opposite pair of levers, is fitted in a cylinder 71 secured upon the platform in central relation thereto.

The opposite, outer extremities of the rods 69 terminate in bifurcated detents or nuts 72 adapted to engage the thread of the respective lead screws 57 and the members of the two toggles formed by the interconnection of the two sets of reversedly mounted levers with the respective piston rods, are so arranged that when the extremities 66 of the levers engage the thereto opposite grooves in the columns 4, the detents are disengaged from the thread of the screws 57 and vice versa. Spiral springs 73 arranged between each of the pistons 70 and glands secured at opposite ends of the cylinder 71, tend to retain the parts in the position illustrated in Fig. 8 of the drawings in which the levers 64 engage the columns and the nuts 72 are disengaged from the screws.

The motive fluid by which the locking mechanism is actuated, is introduced into the cylinder 71, intermediate the two pistons through a pipe 74 which connects with a small reservoir 75 secured upon the platform and which is supplied with air by means of a conduit 76 connecting with the beforenamed supply pipe 25. The conduits 74 and 76 at opposite sides of the reservoir are respectively provided with valves 77 and 78, one of which is open while the other one is closed and whose stems are connected with upwardly ranging arms 79, the upper ends of which connect with the terminal portion of a bar 80 which extends in parallel relation to the platform and terminates in proximity to the drill carriage 8. The cylinder 71 has in its wall two or more exhaust ports 81 which when the two pistons have reached the end of their outward stroke, come in communication with the intermediate portion of the interior of the cylinder and thus afford an outlet for the air introduced thereinto through the pipe 74 from the reservoir 75.

The above described mechanisms which are respectively employed to impart an intermittent, vertical movement to the platform and a lateral motion to the therewith associated drill carriage are actuated by the following means. Pivotally secured to lugs 82 upon the extension of each base 13 of the carriage 18, in advance of the respective drills 9 when the latter are in their rearmost position, are normally vertical levers 83, the lower arms of which connect respectively with the adjacent extremity of pitmen 84 which respectively extend alongside the various bases upon the carriage and in parallel relation to the longitudinal axes of the drills. The extremity of the upper arm of each of the levers 83, projects in the path of a laterally projecting ridge 85 which extends longitudinally along the adjacent side of each of the drills of which it forms part and whose function is to cause the normally perpendicular lever 83 to turn about its fulcrum and to impart a consequent longitudinal movement to the therewith connected pitman during the reciprocating movement of the drill. The opposite ends of the various pitmen have slots, through which project the wrist pins of crank arms 86 which respectively depend in adjacency to the different drills comprised in the battery, from a crank shaft 87 which is rotatably mounted in suitable bearings, transversely of the carriage 8. The shaft 87 is furthermore provided with an upwardly extending arm 88, whose upper extremity carries a gravity pawl 89 which engages the peripheral teeth of a ratchet wheel 90 secured upon a shaft 91 which is mounted in bearings 92 on the carriage. A spring 93 engaging the arm 88 is provided to resiliently maintain the pawl in engagement with the teeth of the wheel 90. Mounted upon the same shaft 91 are two cams 94 and 95 arranged at right angles to each other and respectively adapted to cause through instrumentality of therewith co-operative appliances, reversal of the valves which control the ingress of motive fluid into the cylinder 49 and into the reservoir 75.

One of the above referred to appliances is composed of an arm 96 one extremity of which is secured to the stem of the three-way valve 55, which controls the flow of air through the conduit 54 upon the cylinder 49, while its other extremity extends below the cam 94 and is resiliently held in engagement therewith by means of a spring 97. The other appliance includes a lever 98 fulcrumed upon a bearing 99 which is secured upon the upper surface of the platform 6 and which is pivotally connected with the extremity of the hereinbefore mentioned connecting bar 80 to whose opposite extremity the cranks 79 of the valves 78 and 77 which respectively control the ingress and egress of air into the reservoir 75, are attached. The free extremity of the lever 98 projects below the cam 95 and is held resiliently in contact therewith by means of a spring 100. The cam 95 is considerably wider than the cam 94, as is shown in Fig. 5, for the purpose of its remaining in contact with the lever 98 during lateral movement of the carriage 8.

The sliding bar 42 upon the front end of the platform 6 is impelled to move laterally during the outward movement of the extremity 66 of one of the levers 64, through instrumentality of a lever 101, fulcrumed at 110 in a recess in the lower surface of the extension 7 of the said platform. The long arm 102 of this lever projects through an opening 103 in the sliding bar while its opposite short arm 104 is pointed and projects in the arcual path of a dog 105 which is pivotally secured upon the adjacent lever 64 in proximity to its extremity 66. The inward movement of the dog 105 is limited by a stop 106 and it is maintained in its normal position in engagement with the said stop by means of a spring 107. When the extremity of the lever 64 moves inwardly the dog will thus pass the extremity of the arm 104 without effecting its displacement. On the return movement of the said arm, however, the dog held against the stop 106, will carry the said arm outwardly for a limited distance, thereby causing longitudinal movement of the bar 42 in an opposite direction, as is shown in broken lines in Fig. 8 of the drawings. The moment the dog 105 disengages the lever, the bar 42 is returned to its original position by contraction of the spring 45 and the lever 101 is returned to its normal position in contact with a stop 108, by means of a spring 109.

Having thus described the mechanical construction of my drilling machine, its operation is as follows:—The truck 2 having been moved in proximity to the wall 112 which it is desired to penetrate, is secured against retrograde movement by any suitable means such as props, brakes, braces or the like, whose construction and arrangement depends on circumstances and which for this reason have not been shown in the drawings.

The number of batteries employed on the machine and the number of drills comprised in each battery may be varied in accordance with circumstances and the areal dimensions of the opening it is desired to produce. This description, however, will be limited to a machine having two batteries each of seven drills, as is shown in the drawings, the operation of the device remaining the same in case more batteries and drills are employed.

It will be observed that the arrangement of the drill carriage and operating parts in relation to the platform 6 has been reversed in the lower one of the two batteries represented in the drawings and have been placed below instead of above the said platform. This is done to permit the drills on the lower platform to penetrate the wall in close proximity to the ground upon which the truck is located, and the reversed position of the parts does in no way affect or alter their operation.

In the machine illustrated in the drawings the drill carriers are normally positioned in central relation to the respective platforms and during the operation are moved laterally toward the right side of the machine, the foremost end of which faces the rock.

The operation of drilling the rock may be commenced at either the upper or lower left hand corner of the area to be bored and to this end the two batteries are positioned so that the one is either at the upper or lower extremity of the superstructure supported upon the truck and the other one midway, intermediate the said extremities. The three-way valves 23 on the pipe 22 are at the beginning of the operation in a position to admit air in the space behind the respective pistons 18, the valve 55 on the cylinder 49, to admit air in front of the piston 50 (which is thus maintained in its normal position), the valves 77 and 78 which control the ingress and egress of air into the reservoir 75 are respectively closed and open and the valves 28 which control the air inlet into the drill housings, are closed, the levers 29 being in engagement with the projections 30, as illustrated in Fig. 6. When the valves 23 are in the above named position, the members of the toggle 34 and the therewith associated pendant 40 are in their uppermost position, the bar 36 engaging the lower surface of the ridge 38 and the pivot pin at the end of the lever 35 being in the lower portion of the slot 36ª of the said bar (see Fig. 16). By opening of the throttle valve (not shown in the drawings) the air is allowed to flow through the main supply pipe 25 into the various conduits and entering the space behind the piston 18, causes the various drills to move forwardly. After the drills have moved a short distance the levers 29 disengage the stops 30 and assuming their perpendicular position, reverse the position of the valves 28, which thus admit air into the drill housings and cause the reciprocating and rotary movement of the bits 17. When one of the latter has advanced into the rock, a predetermined distance, the rear end of the respective drill housing has passed the point of location of the vertically movable bar 36, which thus being freed from contact with the ridge 38, moves upwardly, impelled by action of the spring 37, and reverses the position of the toggle and the therewith connected valve as is shown in Figs. 7 and 17. The air behind the piston 18 is now permitted to exhaust through a port in the valve housing, and the live air in the pipe 25 flows into the space in the front of the said piston and thus returns the drill to its retracted or normal position. While the drill moves rearwardly, the ridge 38 again engages the bar 36 which, by reason of its being formed with the slot 36ª, is thereby depressed without affecting the position of the toggle 34 and the valve 23 (see Fig. 18). The moment the housing has reached its innermost position, the crank 29 is engaged by the projection 30 and the valve 28 is consequently closed, which shuts off the air from the interior of the drill.

At the time that the drill commenced its forward movement, the upper extremity of the lever 83 was engaged by the ridge 85 and impelled to move about its fulcrum, resulting in the corresponding longitudinal displacement of the connecting bar 84 which by engagement with the lower extremity of the crank 86, imparted a rotative movement to the therewith connected shaft 87 and a consequent rearward movement of the arm 88 and the pawl 89 carried thereby, causing the latter to engage the preceding one of the four teeth on the wheel 90. As each one of the drills returns to its original position, the lever 83 being disengaged from the ridge 85, is free to reassume its normal or perpendicular position but is held from doing so as long as one of the other drills comprised in the battery is in its forward position for the reason that the engagement of the therewith associated bar 84 with the respective wrist pin on the crank 86 holds the shaft 87 against rotative movement. As soon, however, as the last drill has returned to its original position, and the last one of the levers 83 is disengaged, the shaft 87 will be free to rotate by action of the spring 93, which returns the therewith connected parts to their former position and causes the ratchet wheel 90 to rotate one fourth of a revolution. The consequent movement of the shaft 91 and the therewith connected cam 94 causes the lever 96 to be depressed and the thereto attached valve 55 to be reversed which exhausts the air from the front portion of the cylinder 49 and permitting it to enter into the space in front of the stationary piston, causes the drill carriage to move toward the right of the machine for a limited distance determined by a stop 113 on the platform. The lever 98 which at the beginning of the movement is disengaged from the peripheral concentric surface of the cam 95, still remains in this relation after the partial rotation of the shaft upon which the said cam is mounted and the position of the valves 77 and 78 is, in consequence, not disturbed.

During the lateral motion of the drill carriage in the direction of the arrow in Fig. 11, the extremities of the pendants 40 engage the inclined surfaces 47 of the bar 42 on the platform with the result that they are forced up and outwardly in the manner hereinbefore explained, until when the carriage has reached its outermost position, they are in the position illustrated in Figs. 13 and 14, engaging the outer face of the bar, after having reversed the position of the toggles and the therewith associated valves 23, (Fig. 16). The position of the pendants on the outside of the bar leaves them free to move downwardly when during subsequent forward movement of the drills, the position of the toggles is again reversed through the upward motion of the bars 36. The various moving parts of the device are thus once more in the position in which they were at the commencement of the operation and the drills will again penetrate the rock until they have advanced the required predetermined distance. The distances between the centers of the parallel bits in the drills included in each battery, slightly exceeds a length equal to twice the diameter of the hole produced by one of the said drills and the lateral movement of the drill carriage is limited to one half the said distance with the result that after a row of bores has been formed during the first forward movement of the drills, the second movement, after the carriage has been moved laterally, will produce a number of holes in alinement with the first ones and respectively located at equal distances therefrom. The result is a row of holes separated by thin partitions.

When after their second forward movement the drills have been once more returned to their original positions, in the manner hereinbefore described, the shaft 91 is again rotated one fourth of a revolution, causing the position of the valve 55 to be again reversed and permitting the consequent returning of the drill carriage to its original position on the platform. The toggles 33 remain during this movement, in the position illustrated in Fig. 18, as the pendants moving along the outer surface of the bar did this time not affect the position of the parts from which they are suspended but were returned to their position in the depressions in the bar 42, as shown in broken lines in Fig. 11. During the second movement of the shaft 91, the lever 98 is engaged by the peripheral, concentric surface of the cam 95 with the result that the position of the two valves 77 and 78 is reversed which closes the communication between the supply pipe 25 and the reservoir 75 and allows the air contained in the latter to exhaust into the space between the pistons 70 in the cylinder 71, causing the said pistons to separate with the result that the detents 72 at the end of the rods 69 engage the threads of the screws 57 and the arcual extremities 66 of the levers 64 are simultaneously moved out of engagement with the grooves in the columns 4 into which they projected during the movement of the drills for the purpose of holding the platform against vertical displacement. The engagement of the detents or nuts 74 with the screws 57, which during the entire operation of the device are slowly rotated by the motor 63, causes the platform to be either raised or lowered in accordance with the direction of rotation of the motor. The moment the pistons 70 have reached the end of their outward strokes, the air which caused their movement is exhausted through the ports 81 and the parts of the locking mechanism are retained in the adjusted positions by the engagement of the extremities 66 of the levers 64 with the circumferential surface of the columns, in which position they remain until the said extremities have reached a position opposite the succeeding grooves 4ª of the columns into which they will enter by action of the springs 73, while the detents are simultaneously disengaged from the screws 57.

During the out and inward movements of the lever 64, shown in Fig. 8 of the drawings, the dog 105 engaged the arm 104 of the lever 101 in the manner hereinbefore described with the result that at the same time the extremities 66 of the levers reënter the grooves in the columns, the bar 42 is moved longitudinally to assume the position illustrated in Fig. 15, thereby causing the inclined surfaces 48 in its upper surface to engage the extremities of the pendants 49 which in consequence are raised and which return the toggles and the therewith associated valves to the position illustrated in Fig. 16.

The various members of the machine with the exception of the valves 77 and 78 are now once more in the position they occupied at the beginning of the operation and the latter are returned to their original position during the next rotative movement of the shaft 87 which occurs when the drills have all been retracted and the carriage commences its lateral movement. The distance between the grooves 4ª of the columns and the consequent length of the downward movement of the platform, is equal to the length of the lateral travel of the drill carriage, with the result that the second row of holes will be separated from the adjoining row by thin partitions equal to those between the holes comprised in each horizontal row and the various partitions will when the entire area has been traversed, present a honey comb which may readily be removed by striking them with a hammer or dislodging them by the application of a wedge or similar tool. To return the platforms to their original positions after they have reached the end of their limited vertical movement, the levers 64 may be withdrawn from contact with the columns and retained in their retracted position by any suitable means such as a pin 64ª inserted into a corresponding aperture in the platform 6 (see Fig. 9), while the platforms are moved up or downwardly by the engagement of the nuts 72 with the screws 57. In case it is desired to discontinue the action of some of the drills for the purpose of penetrating rock along a diagonal line with the object of following a metallic vein in mining ores, or when one or more of the drills are disabled by breakage or wear, they may be shut off from the main air supply by means of suitably located valves which being obvious, have been omitted from the drawings.

It will be observed that the bits in the various drills comprised in the two batteries illustrated in the drawings, extend in eccentric relation to their housings with the object of permitting the various parts of the machine to enter the opening produced by the repeated actions of the drills upon the face of the rock.

Having thus described my invention what I claim is:—

1. A tunneling machine comprising, in combination with a suitable support, a battery of rock drills, means for presenting said battery to a working face, means for projecting said drills of said battery in said face and means for automatically moving said battery laterally after each projection of said drills.

2. A tunneling machine comprising in combination with a suitable support, a battery of rock drills, means for imparting a series of rectilinear movements to said battery, and means for automatically performing said movements, in progressive cycles, each cycle comprising a longitudinal, lateral and vertical movement.

3. A tunneling machine comprising in combination, a suitable support, a battery of rock drills, and means for automatically causing said battery to move laterally and vertically in predetermined steps equal to an aliquot part of the distance between two successive drills.

4. A tunneling machine comprising in combination with a suitable support, a battery of rock drills and means to impart a predetermined intermittent, vertical movement to said battery.

5. A tunneling machine comprising in combination with a suitable support a battery of rock drills, means for presenting the drills of said battery for independent operation in said working face and means for imparting a successively repeated series of rectilinear operative movements to said battery.

6. A tunneling machine, comprising in combination, a suitable support, a vertically movable platform carried thereby, a battery of rock drills carried by said platform means for presenting said battery to a working face, means for independently projecting each drill into a working face, means for moving said battery as a unit a predetermined distance in a lateral direction with relation to said vertically movable platform, and means for vertically moving said platform a predetermined distance with relation to said support all of said means being automatically and segmentally actuated.

7. A tunneling machine, comprising in combination, a suitable support, a battery of rock drills, means for presenting said battery to a working face, and means for projecting independently each drill of said battery for operation in said face.

8. A tunneling machine comprising in combination with a suitable support, a battery of rock drills, and means to impart alternate lateral and vertical movements thereto.

9. A tunneling machine comprising in combination with a suitable support, a battery of rock drills, means adapted to impart a predetermined forward movement to each drill, means to reverse the said movement at its termination and means to vary the position of the said battery in relation to the said support.

10. A tunneling machine comprising in combination with a suitable support, a battery of independently operating rock drills each including a reciprocating, rotary bit, means adapted to impart a predetermined forward movement to each drill, automatic means to simultaneously cause actuation of the respective bit, automatic means to reverse the movement of the drill at the termination of its forward movement, automatic means to simultaneously discontinue the movement of the bit and means to vary the position of the said battery in relation to the said support.

11. A tunneling machine comprising in combination with a suitable support, a battery of rock drills, automatic means to impart to each drill a reciprocating motion of predetermined length, a device adapted to impart a lateral movement to the battery, and a mechanism associated with the various drills comprised in the battery, and adapted to actuate the said device by coöperative actions of the said drills at the termination of their return movements.

12. A tunneling machine comprising in combination with a suitable support, a battery of longitudinally reciprocating rock drills including equidistant bits, a contrivance adapted to laterally move the said battery a distance equal to an aliquot part of the distance between each two adjacent bits and means associated with the various drills comprised in the battery and adapted to actuate the said contrivance upon the termination of their return movements.

13. A tunneling machine comprising in combination with a suitable support, a battery of independently operating rock drills, means for projecting said drills to operate on a rock face, means adapted to impart an intermittent vertical movement to said battery, and a device associated with the various drills comprising the battery and adapted to operate said means for imparting a vertical movement to said battery at the termination of the return movement of the drills.

14. A tunneling machine comprising in combination with a suitable support, a battery of rock drills, automatic means adapted to impart a reciprocating movement to each drill, a mechanism adapted to impart a lateral movement to the said battery alternately in opposite directions, means adapted to operate the said mechanism at the termination of the reciprocating movement of the various drills comprised in the battery, and a contrivance adapted to intermittently move the said battery a predetermined distance in a vertical direction.

15. A tunneling machine comprising in combination with a suitable support, a battery of rock drills operatively mounted to be longitudinally reciprocated, means adapted to impart a reciprocatory lateral movement to said battery as a unit, at the termination of the longitudinal movements of said drills, and means arranged to vertically move said battery at the end of the laterally reciprocating movements of the battery unit, all of said movements occurring automatically in a progressive cycle.

16. A tunneling machine comprising in combination with a suitable support, a battery of longitudinally reciprocating rock drills, means to impart an intermittent vertical movement thereto, means adapted to move the said battery laterally in opposite directions and automatic means to actuate the said drills alternately with the said lateral movements.

17. A tunneling machine comprising in combination a truck, a superstructure thereon, a platform movably supported upon the latter, means to impart an intermittent vertical movement to the said platform, a carriage laterally-movably supported upon the said platform, a series of rock drills reciprocatingly supported upon the carriage and means to impart a lateral reciprocating movement to the said carriage.

18. A tunneling machine, comprising in combination, a battery of rock drills, a support for said battery comprising a platform, standards carrying said platform, and means for disengaging said platform from said standards to move it vertically step-by-step.

19. A tunneling machine comprising in combination, a battery of rock drills, a support for said battery comprising a platform, a plurality of standards, a plurality of levers secured to said platform and engaging said standards, means for disengaging said levers from said standards and means for moving said platform along said standards step-by-step.

20. A tunneling machine comprising in combination, a battery of rock drills, a support for said battery comprising a platform, a plurality of standards, a plurality of levers secured to said platform and engaging said standards, a plurality of vertical lead screws, and means for disengaging said levers from said standards and causing them to engage said lead screws to vertically move said platform step-by-step.

In testimony whereof I have affixed my signature in presence of two witnesses.

GEORGE R. BENNETT.

Witnesses:
G. J. ROLLANDET,
K. M. STUMP.